United States Patent Office 3,336,275
Patented Aug. 15, 1967

3,336,275
PROCESS FOR THE POLYMERIZATION OF NOR-
BORNENE DERIVATIVES USING SALTS OF IRID-
IUM, OSMIUM OR RUTHENIUM
Francis W. Michelotti, Brooklyn, N.Y., assignor to In-
terchemical Corporation, New York, N.Y., a corpora-
tion of Ohio
No Drawing. Filed Sept. 8, 1964, Ser. No. 395,061
4 Claims. (Cl. 260—80)

This invention relates to the catalytic polymerization of norbornene derivatives using ruthenium, osmium, or iridium salts as catalysts.

We have found that at least the norbornene compounds represented by the formula

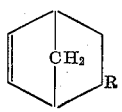

where R can be —$CH_2Cl$, —$CH_2OH$, —H, —$Si(OC_2H_5)_3$, —$CH_2OCH_3$, and

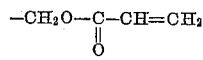

can be polymerized essentially stereo-specifically to high-molecular weight polymers in excellent conversions, using as polymerization catalysts hydrated salts of $Ru^{+++}$, $Os^{+++}$, and $Ir^{+++}$. The other metals of the platinum group, Pt, Pd, and Rh are ineffective. The catalysts of this invention are ineffective in the polymerization of styrene, cyclopentadiene, and alkyl vinyl ethers, for example. Polymerization times vary from a few hours to a few minutes depending principally on the metal used as catalyst. Iridium is more effective than osmium and osmium is more effective than ruthenium.

When R in the above formula is —CN, no polymerization occurs. When R is —$CH_2Cl$, —H, —$CH_2OCH_3$, —$CH_2OH$, or

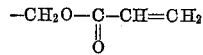

soluble polymers are obtained and may be used in coating compositions and the like.

Related subject matter is in the Journal of the American Chemical Society 83, 4864 (1961) and ibid. 84, 4145 (1962).

Example 1

15.2 g. of bicyclo (2.2.1)-heptene-2, 0.31 g.

$$RuCl_3 \cdot XH_2O$$

and 50 ml. Synasol (specially denatured ethanol) were heated around reflux temperature for several hours until a large lump of insoluble material was observed in the mixture. Then the heat was cut off and the solid lump was separated from the liquid. After several washings with acetone the solid was dissolved in hot benzene and precipitated with an excess of methanol. A repetition of this treatment yielded a fairly light-colored polymer.

Example 2

Example 1 was repeated using half the amount of catalyst (1% rather than 2%). The yield was not much more than 1/3 that of the previous run.

Example 3

10 g. of bicyclo (2.2.1)-heptene-2, 0.2 g. $IrCl_3 \cdot XH_2O$, and 80 ml. Synasol were heated to reflux temperature. In about 5–10 minutes a large lump of white coagulum appeared. It increased rapidly in size and the run had to be stopped in an hour when stirring became impossible. The solid material was washed with acetone and dried under nitrogen. It appeared to be only partly soluble in benzene.

Example 4

10 g. of bicyclo (2.2.1)-heptene-2, 0.2 g. $OsCl_3 \cdot XH_2O$, and 75 ml. Synasol were heated to reflux. Coagulum appears within half an hour. After 4 hours the run was stopped and the lump of solid material was washed with acetone and Synasol. Except for some catalyst particles the solid was completely soluble in benzene, but went into solution quite slowly. It was readily precipitated from benzene solution by methanol.

Similarly, polymerization of bicyclo (2.2.1)-heptene-2 was attempted using the other members of the platinum metal group, Rh, Pt, and Pd, but without success.

Besides the successful polymerization described in the examples it was found that the iridium, the ruthenium, and the osmium catalysts also operated similarly to polymerize the R=—$CH_2OCH_3$,

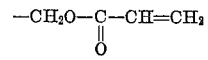

—$CH_2OH$, or —$Si(OC_2H_5)_3$ derivatives.

Synasol is 95% ethanol, specially denatured.

What is claimed is:
1. Process for the polymerization of norbornene compounds represented by the structural formula

wherein R is selected from the group consisting of —$CH_2Cl$, —$CH_2OH$, —H, —$Si(OC_2H_5)_3$, —$CH_2OCH_3$, and

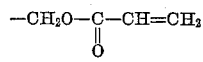

comprising
(A) heating the monomer in the presence of a minor amount of a hydrated trichloride of a metal selected from the group consisting of iridium, osmium, and ruthenium in
(B) denatured ethanol, and
(C) separating the polymer.
2. The process described in claim 1 where the metal is iridium.
3. The process described in claim 1 where the metal is osmium.
4. The process described in claim 1 where the metal is ruthenium.

References Cited

UNITED STATES PATENTS

| | | | |
|---|---|---|---|
| 2,421,597 | 6/1947 | Bruson | 260—91.1 |
| 2,799,668 | 7/1957 | Anderson et al. | 260—93.1 |
| 2,838,479 | 6/1958 | Biletch | 260—89.5 |
| 2,918,459 | 12/1959 | Nowlin et al. | 260—93.7 |
| 2,985,611 | 5/1961 | Gaylord et al. | 260—89.5 |
| 3,220,988 | 11/1965 | Hoch | 260—91.5 |

FOREIGN PATENTS

| | | |
|---|---|---|
| 897,099 | 5/1962 | Great Britain. |

OTHER REFERENCES

Canale et al.: Chemistry and Industry (London), 1962 (24), pp. 1054–55.

JOSEPH L. SCHOFER, *Primary Examiner.*

H. WONG, *Assistant Examiner.*